United States Patent [19]
Yoneda et al.

[11] Patent Number: 5,605,958
[45] Date of Patent: Feb. 25, 1997

[54] COMPOSITION FOR SURFACE TREATMENT

[75] Inventors: Takashige Yoneda; Fumiaki Gunji; Takeshi Morimoto; Yukiko Ono, all of Yokohama, Japan

[73] Assignee: Asahi Glass Company Ltd., Tokyo, Japan

[21] Appl. No.: 530,911

[22] Filed: Sep. 20, 1995

[30] Foreign Application Priority Data

Sep. 21, 1994 [JP] Japan .................................. 6-226963
Aug. 11, 1995 [JP] Japan .................................. 7-206131

[51] Int. Cl.$^6$ .................................................. C08K 5/06
[52] U.S. Cl. .............. 524/755; 106/287.13; 106/287.11; 106/287.14; 524/757; 524/759; 524/765; 524/766; 524/768; 524/770; 524/771; 524/772; 524/773; 524/792; 524/795; 528/35; 528/36; 528/42; 428/447
[58] Field of Search ..................... 106/287.13, 287.14, 106/287.11; 528/35, 36, 42; 524/755, 757, 759, 765, 766, 768, 770, 771, 772, 773, 792, 795; 428/447

[56] References Cited

U.S. PATENT DOCUMENTS 5,314,731   5/1994   Yoneda et al. .
5,464,704  11/1995   Yoneda et al. .
5,482,768   1/1996   Kawasato et al. .

*Primary Examiner*—Melvyn I. Marquis
*Attorney, Agent, or Firm*—Oblon, Spivak, McClelland, Maier & Neustadt, P.C.

[57] ABSTRACT

A composition for surface treatment, which comprises the following components (I), (II) and (III) as essential components:

(I) at least one compound capable of forming a coating film with a contact angle of at least 70° against water;

(II) a solvent capable of dissolving the component (I); and (III) a solvent having an evaporation rate lower than the component (II).

19 Claims, No Drawings

COMPOSITION FOR SURFACE TREATMENT

The present invention relates to a novel composition for surface treatment. Particularly, it relates to a composition for surface treatment which is capable of forming a coating film excellent in antifouling properties on various substrates such as glass, plastics, ceramics or metals. Further, the present invention relates to a substrate treated with such a composition for surface treatment, an article employing such a substrate and a method of coating such a composition for surface treatment.

Various substrates such as glass, plastics, ceramics or metals, or various substrates having surface treatment layers, are used in various fields, but deposition of dusts or oil stains on the substrate surfaces or adverse effects brought by water on the substrate surfaces, are problematic.

For example, for transportation equipments such as trains, automobiles, ships and aircrafts, the surfaces of exterior parts such as exterior panels, window glasses and surface materials for display devices, and interior parts such as surface materials of instrument panels or other articles, are desired to be always clean. If raindrops, dusts or soils are deposited on the surfaces of such transportation equipments, or if moisture condenses on the surfaces by the influence of the temperature or the humidity in air, the appearance will be impaired. Further, if the surfaces are to be touched or to be in direct contact with persons, there will be uncomfortable feeling or hygienic problems. Furthermore, the essential function of such transportation equipments is likely to be impaired. Especially when the article of a transportation equipment is an article required to have transparency of see-through property (such as window glass or mirror), a reduction in the transparency or see-through property impairs the essential function of such an article and is likely to be a cause for a serious accident.

A means for removing dust, oil stain or water (such as wiping or removal by a wiper) may sometimes impart fine scratch marks on the surface. Further, foreign particles accompanying the dust, oil stain or water may aggravate the scratch marks. Furthermore, it is well known that when water is deposited on a glass surface, glass components elute into the water, whereupon the surface is eroded (so-called scorching). Strong abrasion to remove such scorching tends to lead formation of fine irregularities on the surface. Further, the see-through portion made of the glass having such scorching or having such fine irregularities formed on the surface, loses the essential function, and light scattering takes place at the surface, and it tends to be difficult to secure the visual field, whereby there will be a problem also from the viewpoint of safety.

Further, dusts, stains and water are likely to give adverse effects to the surfaces of transportation equipments to promote damages, staining, discoloration, corrosion, etc. and to cause a change in the electrical properties, the mechanical properties, the optical properties, etc. of articles for transportation equipments. Adverse effects of this type are problematic not only for the articles for transportation equipments but also in various fields such as articles for architecture or articles for electric or electronic equipments.

To solve such problems, it has been strongly desired to impart to the substrate surface a nature which reduces deposition of dusts, stains and waterdrops or a nature which facilitates removal of such deposition (such natures will be hereinafter referred to simply as an antifouling property). For example, heretofore, it has been proposed to impart an antifouling property by directly coating a silicone wax, a silicone oil made of an organopolysiloxane or a surfactant.

However, conventional compositions for surface treatment require pretreatment in many cases and have had a problem that they tend to cause coating irregularity during their application. Further, the adhesion of the treating agents themselves to the substrates is rather low, whereby the antifouling property does not last for a long period of time, whereby the application range has been rather limited.

Further, in a case where an antifouling property is to be imparted to an article which is already in use, it is necessary to impart the antifouling property simply by direct treatment of such an article at at room temperature. For example, when a commercially available front glass of an automobile is to be treated, it is not economical to replace the entire front glass of each automobile. Further, it is practically impossible to subject the entire automobile to baking after coating. However, with treating agents heretofore proposed, there has been a problem that if the antifouling treatment is conducted simply by direct treatment at room temperature, the performance has been inadequate.

It is an object of the present invention to solve the above drawbacks inherent to the conventional treating agents and to provide a composition for surface treatment which is capable of imparting an excellent antifouling property to various types of substrates.

Namely, the present invention provides a composition for surface treatment, which comprises the following components (I), (II) and (III) as essential components:

(I) at least one compound capable of forming a coating film with a contact angle of at least 70° against water;

(II) a solvent capable of dissolving the component (I); and (III) a solvent having an evaporation rate lower than the component (II).

Now, the present invention will be described in detail with reference to the preferred embodiments.

It is the most important feature that the composition for surface treatment of the present invention comprises components (I), (II) and (III) as essential components. Among these essential components, the component (I) (hereinafter referred to as Compound I) is at least one compound capable of forming a coating film with a contact angle of at least 70° against water. Compound I is a component which provides water repellency and an antifouling property.

The structure of Compound I is not particularly limited, and any compound which is capable of forming a coating film with a contact angle of at least 70° against water, may be employed. For example, a known or well known compound may be mentioned, such as a silicone resin, a silicone oil, a fluorine resin, a fluorine oil, a polyethylene resin or a polyester resin.

Since Compound I is a compound capable of forming a coating film with a contact angle of at least 70° against water, it is preferably a compound having at least one hydrophobic group. As the hydrophobic group, a long chain hydrocarbon group or a polyfluoroorganic group is, for example, preferred, and a polyfluoroorganic group is particularly preferred.

The hydrocarbon group of the present invention may be either an aromatic hydrocarbon group or an aliphatic hydrocarbon group and is preferably an aliphatic hydrocarbon group. The aliphatic hydrocarbon group may be a saturated aliphatic hydrocarbon group or an unsaturated aliphatic hydrocarbon group, and particularly preferred is a saturated aliphatic hydrocarbon group. The aliphatic hydrocarbon group may have a straight chain, branched or cyclic structure, and a straight chain or branched structure is preferred. The aliphatic hydrocarbon group may, for example, be an alkyl group, an alkenyl group, a cycloalkyl group, an alkylene group, an alkenylene group, a cycloalkenylene group, or a group containing such a group as a partial structure. The aromatic hydrocarbon group may, for example, be an aryl group.

The long chain hydrocarbon group preferable as one of the hydrophobic groups of the present invention, is the one having at least 7 carbon atoms, preferably from 7 to 30 carbon atoms, among the above-mentioned hydrocarbon groups. The long-chain hydrocarbon group preferably has a straight chain or branched structure. In the case of a branched structure, the branched moiety is preferably a short chain having from 1 to 3 carbon atoms. As the long chain hydrocarbon group, a long chain alkyl, alkylene, alkenyl or alkenylene group is preferred, and a long chain alkyl or alkylene group is particularly preferred. The long chain alkyl group preferably has from 7 to 30 carbon atoms, and the alkylene group preferably has from 7 to 16 carbon atoms. The long chain hydrocarbon group may be a group having the above-mentioned long chain alkyl or alkylene group as a partial structure. In such a case, the preferred carbon number of such an alkyl or alkylene group may be the same as above.

The polyfluoroorganic group which is preferred as another hydrophobic group of the present invention, is a group having at least two hydrogen atoms of an organic group substituted by fluorine atoms. The carbon number of the polyfluoroorganic group is preferably from 3 to 21. The polyfluoroorganic group is preferably a polyfluorohydrocarbon group having at least two hydrogen atoms of the above-mentioned hydrocarbon group substituted by fluorine atoms. Particularly preferred is a polyfluoroalkyl group or a polyfluoroalkylene group.

The proportion of fluorine atoms in the polyfluoroorganic group is preferably at least 60%, particularly at least 80%, as represented by the number of fluorine atoms in the polyfluoroorganic group/the number of hydrogen atoms in the non-substituted organic group×100.

When the polyfluoroorganic group is a polyfluorohydrocarbon group, it may be a polyfluorohydrocarbon group having an oxygen atom, or a polyfluorohydrocarbon group having a sulfur atom. The polyfluorohydrocarbon group having an oxygen atom may, for example, be a group having at least one carbon atom of a polyfluorohydrocarbon group substituted by an ether type oxygen atom. Particularly preferred is a polyfluoroalkyloxy group, a polyfluoroalkyleneoxy group, a group having a polyfluoroalkyloxy moiety, or a group having a polyfluoroalkyleneoxy moiety. The polyfluorohydrocarbon group having a sulfur atom may, for example, be a group having at least one carbon atom of a polyfluorohydrocarbon group substituted by a thioether type sulfur atom. Particularly preferred is a polyfluoroalkylthio group, a polyfluoroalkylenethio group, a group having a polyfluoroalkylthio moiety, or a group having a polyfluoroalkylenethio moiety.

Further, the polyfluoroorganic group is preferably a perfluoroorganic group having all hydrogen atoms in an organic group substituted by fluorine atoms or a group having such a perfluoroorganic group as a partial structure. Particularly preferred is a perfluoroalkyl group, a perfluoroalkylene group, a perfluoroalkyloxy group a perfluoroalkyleneoxy group, a perfluoroalkylthio group, a perfluoroakylenethio group having all hydrogen atoms in the above-mentioned polyfluorohydrocarbon groups substituted by fluorine atoms, or a group having such a perfluoro group as a partial structure. Among them, a perfluoroalkyl group, a perfluoroalkylene group or a group having a perfluoroalkyl moiety or a perfluoroalkylene moiety, is preferred. Particularly preferred is a group having a $C_{3-21}$ perfluoroalkyl moiety or a group having a $C_{2-16}$ perfluoroalkylene moiety.

Further, Compound I is preferably the one having a structure with a group reactive to the substrate in view of adhesion between the film formed by the composition for surface treatment and the substrate. As such a reactive group, a hydrolyzable group or an isocyanate group is preferred.

For the purpose of the present invention, the isocyanate group and the hydrolyzable group are distinguished. Namely, even if the isocyanate group has a nature as a hydrolyzable group, the two groups will be regarded as different from each other.

Specific examples of the hydrolyzable group include a halogen atom, an alkoxy group, an acyloxy group, an alkoxy-substituted alkoxy group, an aminoxy group, an amino group, a —C=N—OH group, a hydroxyl group, a mercapto group, a carboxyl group, an epoxy group, a glycidyl group, an unsaturated hydrocarbon group such as a vinyl group or an allyl group, and a functional group having an oxygen atom or a nitrogen atom.

Among them, a halogen atom, an alkoxy group, an acyloxy group, an alkoxy-substituted alkoxy group, an oxyamino group (—ONH$_2$), an amino group or a —C=N—OH group is preferred as the hydrolyzable group. Particularly preferred is an alkoxy group, an alkoxy-substituted alkoxy group or an acyl group which is a hydrolyzable group capable of bonding to a silicon atom via an oxygen atom. The alkoxy group, an alkoxy-substituted alkoxy group and the acyl group preferably has from 1 to 8 carbon atoms, particularly from 1 to 4 carbon atoms. Further, as the hydrolyzable group, a $C_{1-4}$ alkoxy group, particularly a methoxy group, an ethoxy group, a propoxy group or a butoxy group, is preferred.

Further, Compound I is preferably a silane compound, particularly a silane compound having the above-mentioned reactive group directly bonded to the silicon atom.

The silane compound having at least one isocyanate group directly bonded to a silicon atom will hereinafter be referred to as an "isocyanate silane compound". Namely, the "isocyanate silane compound" is a silane compound having at least one structure wherein an isocyanate group is directly bonded to a silicon atom (Si—NCO). Further, the silane compound having at least one hydrolyzable group directly bonded to a silicon atom will be referred to as a "hydrolyzable silane compound". Here, the "hydrolyzable silane compound" is a silane compound having at least one structure in which a hydrolyzable group is bonded to a silicon atom (Si-X where X is the above-mentioned hydrolyzable group).

Further, the "hydrolyzable group bonded to a silicon atom" and the "isocyanate group bonded to a silicon atom" will be generally referred to as a "reactive silane group". The "hydrolyzable silane compound" and the "isocyanate silane compound" will be generally referred to as a "reactive silane compound".

Compound I of the present invention is preferably a reactive silane compound having at least one hydrophobic group and at least one silicon atom having an isocyanate group or a hydrolyzable group directly bonded thereto. Further, Compound I is preferably a compound having a plurality of reactive silane groups.

Compound I of the present invention is preferably at least one silane compound selected from the group consisting of a silane compound of the following formula (A) (hereinafter referred to as Compound A), a silane compound of the following formula (B) (hereinafter referred to as Compound B) and a silane compound of the following formula (C) (hereinafter referred to as Compound C):

(A) $(Z^1)_{3-c-b}(R^1)_a(R^2)_b\text{Si}—Y—\text{Si}(R^3)_c(R^4)_d(Z^2)_{3-a-d}$ wherein each of $R^1$ to $R^4$ which are independent of one another, is a hydrogen atom or a $C_{1-30}$ monovalent organic group, Y is a bivalent organic group, provided that at least one of $R^1$ to $R^4$ and Y is a hydrophobic organic group, each of $Z^1$ and $Z^2$ which are independent of each other, is an isocyanate group or a hydrolyzable group, each of a and b which are independent of each other, is 0, 1 or 2, provided $0 \leq a+b \leq 2$, and each of c and d which are independent of each other, is 0, 1 or 2, provided $0 \leq c+d \leq 2$;

(B) $(R^5)_e(R^6)_g(R^7)_h\text{Si}(Z^3)_{4-e-g-h}$ wherein each of $R^5$ to $R^7$ which are independent of one another, is a hydrogen atom or a $C_{1-30}$ monovalent organic group, provided that at least one of them is a hydrophobic organic group, $Z^3$ is an isocyanate group or a hydrolyzable group, and each of e, g and h which are independent of one another, is 0, 1 or 2, provided $1 \leq e+g+h \leq 3$; and (C) $(R^8)_i(R^9)_j(Z^4)_{3-i-j}\text{SiO}[(R^{10})_k(R^{11})_m(Z^5)_{2-k-m}\text{SiO}]_n—\text{Si}(R^{12})_p(R^{13})_q(Z^6)_{3-p-q}$ wherein each of $R^8$ to $R^{13}$ which are independent of one another, is a hydrogen atom or a $C_{1-30}$ monovalent organic group, provided that at least one of them is a hydrophobic organic group, each of $Z^4$ to $Z^6$ which are independent of one another, is an isocyanate group or a hydrolyzable group, each of i, j, k, m, p and q which are independent of one another, is 0, 1 or 2, provided $1 \leq i+j \leq 3$, $0 \leq k+m \leq 2$, $1 \leq p+q \leq 3$ and $2 \leq i+j+k+m+p+q \leq 7$, and n is an integer of 0 or at least 1.

Now, Compounds A to C will be described.

In Compounds A to C, each of $R^1$ to $R^{13}$ which are independent of one another, is a hydrogen atom or a $C_{1-30}$ monovalent organic group. As the monovalent organic group, a hydrocarbon group such as an alkyl group, an alkenyl group, a cycloalkyl group or an aryl group, a halogenated hydrocarbon group such as chloroalkyl group or a polyfluoroalkyl group, a hydrocarbon group or a halogenated hydrocarbon group having a functional group such as a hydroxyl group, an epoxy group, an amino group, a mercapto group or a carboxyl group, or a hydrocarbon group or a halogenated hydrocarbon group having a linking group such as an ester bond, an ether bond, a thioether bond, an imino bond, an amide bond or a urethane bond, is preferred.

When $R^1$ to $R^{13}$ in Compounds A to C contain a hydrophobic organic group, such a hydrophobic organic group is preferably a long chain hydrocarbon group or a polyfluoroorganic group. The carbon number of the long chain hydrocarbon group is preferably from 7 to 30. As the long chain hydrocarbon group, an alkyl group, an alkenyl group or a group containing such a group as a partial structure, is preferred. Among them, an alkyl group having from 7 to 30 carbon atoms, preferably from 7 to 20 carbon atoms, or a group containing such an alkyl moiety is preferred. When it is a group containing an alkyl moiety, it is preferred that the alkyl moiety has a structure connected to a bivalent linking group such as an ester bond, an ether bond, a thioether bond, an imino bond, an amide bond or a urethane bond, and the moiety bonding to the silicon atom is an alkylene group. Specific examples of the long chain hydrocarbon group may be those disclosed in the specific examples of Compounds A to C.

When any one of $R^1$ to $R^{13}$ in Compounds A to C is a polyfluoroorganic group, such a polyfluoroorganic group is preferably a polyfluorohydrocarbon group or a group containing a polyfluorohydrocarbon group as a partial structure, and it may, for example, be a polyfluoroalkyl group, a polyfluoroalkyloxy group, a polyfluoroalkylthio group or a group containing such a group as a partial structure.

Each of $R^1$ to $R^{13}$ is preferably a perfluorohydrocarbon group or a group containing a perfluorohydrocarbon group as a partial structure, and particularly preferred is a perfluoroalkyl group, a perfluoroalkyloxy group, a perfluoroalkylthio group or a group containing such a group as a partial structure. Among them, each of $R^1$ to $R^{13}$ is preferably a group containing a perfluoroalkyl group as a partial structure, and particularly preferred is the one wherein the carbon number of the perfluoroalkyl moiety is from 3 to 16.

The group containing a perfluoroalkyl group as a partial structure, preferably has a structure in which the perfluoroalkyl group and a bivalent linking group are bonded. As the bivalent linking group, a bivalent hydrocarbon group such as an alkylene group, or a bivalent hydrocarbon group containing an ester bond, is preferred, and particularly preferred is a $C_{1-3}$ alkylene group, such as a methylene group, an ethylene group or a propylene group.

Specific examples of the case where each of $R^1$ to $R^{13}$ is a polyfluoroorganic group, may be those disclosed in the specific examples of Compound A to C.

In a case where a non-hydrophobic organic group is present in $R^1$ to $R^{13}$, such a non-hydrophobic organic group is preferably a lower alkyl group, a halogen atom or a phenyl group, and particularly preferred is a lower alkyl group such as a methyl group or an ethyl group.

In Compounds A to C, each of $Z^1$ to $Z^5$ which are independent of one another, is a hydrolyzable group or an isocyanate group. As the hydrolyzable group, among the above-mentioned specific examples of the hydrolyzable group, a group capable of bonding to a silicon atom by an oxygen atom is preferred, and particularly preferred is an alkoxy group, an alkoxy-substituted alkoxy group or an acyl group. When the hydrolyzable group contains carbon atoms, the number of carbon atoms is preferably at most 8, particularly at most 4. Among them, a $C_{1-4}$ alkoxy group is preferred as the hydrolyzable group.

In Compounds A to C, a hydrolyzable group and an isocyanate group may be coexistent in the respective molecules. For example, both an isocyanate group and a chlorine atom may be present. However, it is usually preferred from the viewpoint of easy preparation that as the reactive silane group in the same molecule, only an isocyanate group or only a hydrolyzable group is present.

Now, Compound A will be described in detail.

In Compound A, each of $R^1$ to $R^4$ which are independent of one another, is a hydrogen atom or a $C_{1-30}$ monovalent organic group. Y is a bivalent organic group. The bivalent organic group means a group having one of hydrogen atoms of the above-mentioned monovalent organic group substituted by a linking bond.

Further, at least one of $R^1$ to $R^4$ and Y is a hydrophobic organic group. When at least one of $R^1$ to $R^4$ is a hydrophobic organic group, Y may be a hydrophobic bivalent organic group or a non-hydrophobic bivalent organic group. When $R^1$ to $R^4$ do not contain a hydrophobic organic group, Y is a hydrophobic bivalent organic group. Further, all of $R^1$ to $R^4$ and Y may be hydrophobic organic groups.

When any one of $R^1$ to $R^4$ is a hydrophobic organic group, such a hydrophobic organic group is preferably a long chain hydrocarbon group or a polyfluoroorganic group. When any one of $R^1$ to $R^4$ is a group other than a hydrophobic organic group, such a group is preferably a lower alkyl group, particularly a $C_{1-4}$ alkyl group.

When Y in Compound 1 is an organic group, such an organic group is preferably a bivalent polyfluoroorganic group.

When Y is a bivalent polyfluoroorganic group, the carbon number of such a group is preferably from 6 to 30, more preferably from 6 to 16. As the bivalent polyfluoroorganic group, a polyfluoroalkylene group, a polyfluoroalkyleneoxy group or a polyfluoroalkylenethio group, or a group containing such a group as a partial structure, may be mentioned and particularly preferred is a perfluoroalkylene group or a perfluoroalkyleneoxy group, wherein the moiety to bond to a silicon atom at each terminal is an alkylene group, particularly an ethylene group.

When Y is a group other than a bivalent polyfluoroorganic group, such a group is preferably an alkylene group, an alkyleneoxy group or an alkylenethio group, or a group containing such a group as a partial structure. The carbon number of such a group is preferably from 2 to 30, particularly from 2 to 12. When every one of $R^1$ to $R^4$ in Compound A is a non-hydrophobic organic group, and Y is a group other than a polyfluoroorganic group, the carbon number of Y is preferably at least 7. Specific examples of Y may be those disclosed in the specific examples of Compound A.

In Compound A, each of $Z^1$ and $Z^2$ is a hydrolyzable group or an isocyanate group. As the hydrolyzable group, a $C_{1-4}$ alkoxy group, particularly a methoxy group or an ethoxy group, is preferred.

Each of $Z^1$ and $Z^2$ is a very important structural unit to improve the adhesion between the coating film and various substrates. Therefore, the larger the number, the more firmly the coating film is believed to bond to the substrates. Accordingly, it is preferred that at least two such groups will bond to one silicon atom. Namely, each of a+b and c+d in Compound A is preferably 0 or 1.

Particularly preferred as Compound A of the present invention is a compound having a polyfluoroorganic group as a hydrophobic organic group, and an isocyanate group as a reactive silane group.

Namely, it is preferred that in Compound A, either one of $Z^1$ and $Z^2$ is an isocyanate group, and at least one of Y and $R^1$ to $R^4$ is a polyfluoroorganic group. Particularly preferably, Compound A is a compound wherein both $Z^1$ and $Z^2$ are isocyanate groups, and at least one hydrophobic organic group for Y and $R^1$ to $R^4$ is a polyfluoroorganic group.

Now, specific examples of Compound A will be given, but Compound A is not limited to such specific examples. Further, in the following chemical formulas, each of n and m is an integer of at least 1, R is an alkyl group, preferably a $C_{1-12}$ alkyl group, $R_f$ is a polyfluoroalkyl group, preferably a polyfluoroalkyl group having a perfluoroalkyl moiety of the formula $C_rF_{2r+1}(CH_2)_s$—, wherein r is an integer of from 3 to 12, and s is an integer of from 2 to 4, more preferably the one wherein s is 2. Further, $R_F$ is a perfluoroalkyl group, preferably a perfluoroalkyl group of the formula $C_tF_{2t+1}$—, wherein t is an integer of from 3 to 16. Z is an isocyanate group or a hydrolyzable group, preferably an isocyanate group or an alkoxy group. Each of $R_f$ and $R_F$ is preferably a straight chain group.

(A-1): $Z_3SiC_2H_4CF(CF_2)_nCFC_2H_4SiZ_3$
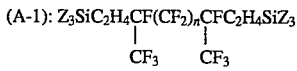

(A-2): $Z_2SiC_2H_4CF(CF_2)_nCFC_2H_4SiZ_2$
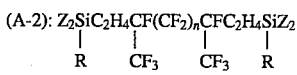

(A-3): $Z_3SiC_2H_4CF(CF_2)_nCFC_2H_4SiZ_2$
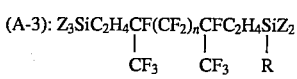

(A-4): $Z_3SiC_2H_4CF(CF_2)_nCFC_2H_4SiZ_3$
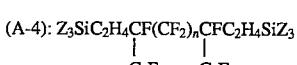

-continued (A-5): $Z_2SiC_2H_4CF(CF_2)_nCFC_2H_4SiZ_2$
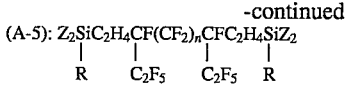

(A-6): $Z_3SiC_2H_4CF(CF_2)_nCFC_2H_4SiZ_2$
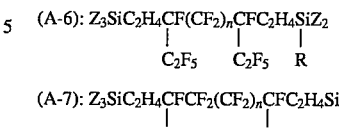

(A-7): $Z_3SiC_2H_4CFCF_2(CF_2)_nCFC_2H_4SiZ_3$
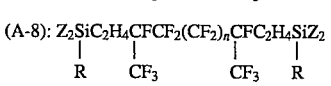

(A-8): $Z_2SiC_2H_4CFCF_2(CF_2)_nCFC_2H_4SiZ_2$
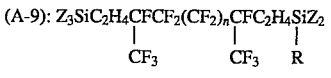

(A-9): $Z_3SiC_2H_4CFCF_2(CF_2)_nCFC_2H_4SiZ_2$
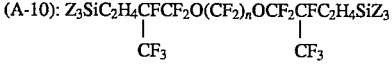

(A-10): $Z_3SiC_2H_4CFCF_2O(CF_2)_nOCF_2CFC_2H_4SiZ_3$
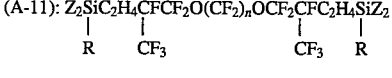

(A-11): $Z_2SiC_2H_4CFCF_2O(CF_2)_nOCF_2CFC_2H_4SiZ_2$
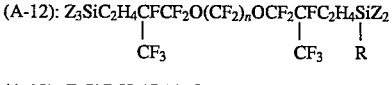

(A-12): $Z_3SiC_2H_4CFCF_2O(CF_2)_nOCF_2CFC_2H_4SiZ_2$
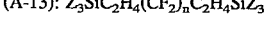

(A-13): $Z_3SiC_2H_4(CF_2)_nC_2H_4SiZ_3$ (A-14): $Z_2SiC_2H_4(CF_2)_nC_2H_4SiZ_2$
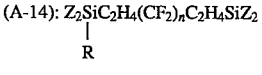

(A-15): $Z_3SiC_2H_4(CF_2)_nC_2H_4SiZ_2$
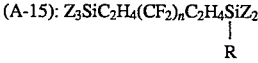

(A-16): $Z_2SiC_2H_4CF(CF_2)_nCFC_2H_4SiZ_2$
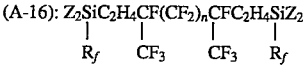

(A-17): $ZSiC_2H_4CF(CF_2)_nCFC_2H_4SiZ$
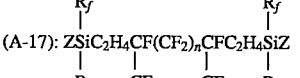

(A-18): $Z_2SiC_2H_4CF(CF_2)_nCFC_2H_4SiZ_2$
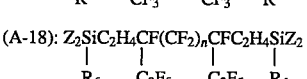

(A-19): $ZSiC_2H_4CF(CF_2)_nCFC_2H_4SiZ$
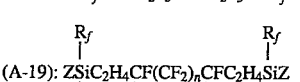

(A-20): $Z_2SiC_2H_4CFCF_2(CF_2)_nCFC_2H_4SiZ_2$
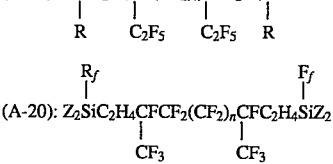

(A-21): $ZSiC_2H_4CFCF_2(CF_2)_nCFC_2H_4SiZ$
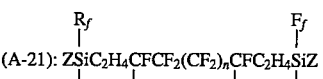

(A-22): $Z_2SiC_2H_4CFCF_2O(CF_2)_nOCF_2CFC_2H_4SiZ_2$
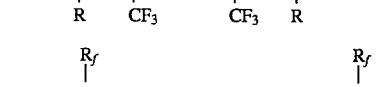

(A-23): $ZSiC_2H_4CFCF_2O(CF_2)_nOCF_2CFC_2H_4SiZ$
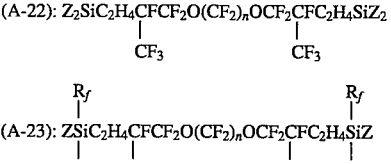

-continued (A-24): Z₂SiC₂H₄(CF₂)ₙC₂H₄SiZ₂ with R_f substituents $$\text{(A-24): } Z_2SiC_2H_4(CF_2)_nC_2H_4SiZ_2$$
with $R_f$ on each Si (A-25): $ZSiC_2H_4(CF_2)_nC_2H_4SiZ$ with R on each Si (A-26): $Z_2SiC_2H_4CF(CF_2)_nCFC_2H_4SiZ_3$ with $R_f$ on one Si, $CF_3$ on each CF (A-27): $Z_2SiC_2H_4CF(CF_2)_nCFC_2H_4SiZ_2$ with R, $CF_3$, $CF_3$, R substituents (A-28): $Z_3SiC_2H_4CF(CF_2)_nCFC_2H_4SiZ_2$ with $C_2F_5$, $C_2F_5$, $R_f$ substituents (A-29): $Z_2SiC_2H_4CF(CF_2)_nCFC_2H_4SiZ$ with R, $C_2F_5$, $C_2F_5$, R and $R_f$ substituents (A-30): $Z_3SiC_2H_4CFCF_2(CF_2)_nCFC_2H_4SiZ_2$ with $CF_3$, $CF_3$, $R_f$ (A-31): $Z_2SiC_2H_4CFCF_2(CF_2)_nCFC_2H_4SiZ$ with R, $CF_3$, $CF_3$, R, $R_f$ (A-32): $Z_3SiC_2H_4CFCF_2O(CF_2)_nOCF_2CFC_2H_4SiZ_2$ with $CF_3$, $CF_3$, $R_f$ (A-33): $Z_2SiC_2H_4CFCF_2O(CF_2)_nOCF_2CFC_2H_4SiZ$ with R, $CF_3$, $CF_3$, R, $R_f$ (A-34): $Z_3SiC_2H_4(CF_2)_nC_2H_4SiZ_2$ with $R_f$ (A-35): $Z_2SiC_2H_4(CF_2)_nC_2H_4SiZ$ with R, R, $R_f$ (A-36): $ZSiC_2H_4CF(CF_2)_nCFC_2H_4SiZ_3$ with R, $CF_3$, $CF_3$, $R_f$ (A-37): $Z_2SiC_2H_4CF(CF_2)_nCFC_2H_4SiZ_2$ with R, $CF_3$, $CF_3$, $R_f$ (A-38): $Z_3SiC_2H_4CF(CF_2)_nCFC_2H_4SiZ$ with $C_2F_5$, $C_2F_5$, $R_f$, R (A-39): $Z_2SiC_2H_4CF(CF_2)_nCFC_2H_4SiZ_2$ with R, $C_2F_5$, $C_2F$, $R_f$ (A-40): $Z_3SiC_2H_4CFCF_2(CF_2)_nCFC_2H_4SiZ$ with $CF_3$, $CF_3$, R, $R_f$ (A-41): $Z_2SiC_2H_4CFCF_2(CF_2)_nCFC_2H_4SiZ_2$ with R, $CF_3$, $CF_3$, $R_f$ (A-42): $Z_3SiC_2H_4CFCF_2O(CF_2)_nOCF_2CFC_2H_4SiZ$ with $CF_3$, $CF_3$, R, $R_f$ (A-43): $Z_2SiC_2H_4CFCF_2O(CF_2)_nOCF_2CFC_2H_4SiZ_2$ with R, $CF_3$, $CF_3$, $R_f$ (A-44): $Z_3SiC_2H_4(CF_2)_nC_2H_4SiZ$ with $R_f$, R (A-45): $Z_2SiC_2H_4(CF_2)_nC_2H_4SiZ_2$ with $R_f$, R (A-46): $Z_2SiC_2H_4SiZ_2$ with $R_f$, $R_f$ (A-47): $Z_2SiC_2H_4SiZ_3$ with $R_f$ (A-48): $ZSiC_2H_4SiZ_3$ with R, $R_f$ (A-49): $ZSiC_2H_4SiZ_2$ with R, R, $R_f$ (A-50): $Z_2SiC_2H_4SiZ_2$ with R, $R_f$ (A-51): $ZSiC_2H_4SiZ$ with $R_f$, $R_f$, R, R (A-52): $ZSiC_2H_4SiZ_2$ with $R_f$, $R_f$, R (A-53): $Z_2SiC_2H_4OC_2H_4SiZ_2$ with $R_f$, $R_f$ (A-54): $Z_2SiC_2H_4OC_2H_4SiZ_3$ with $R_f$

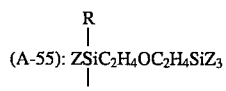
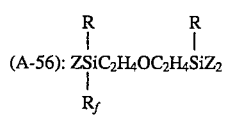
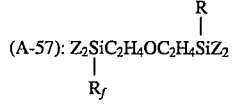
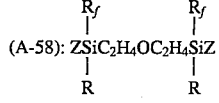
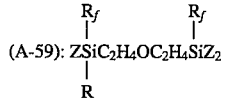
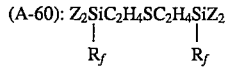
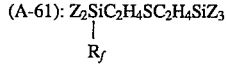
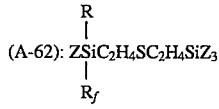
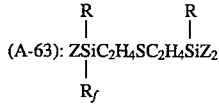
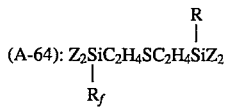
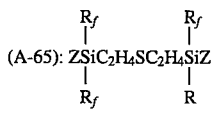
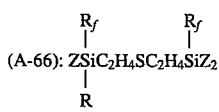
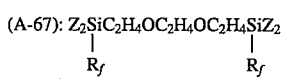
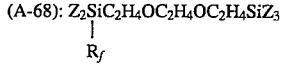
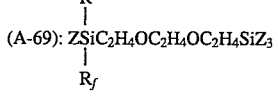
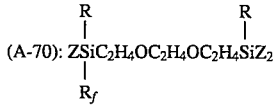

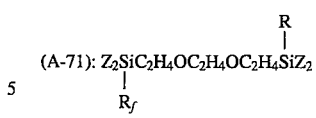
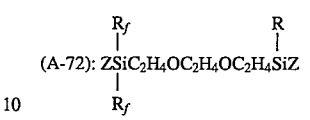
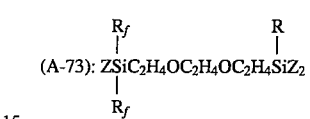
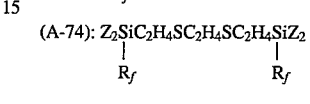
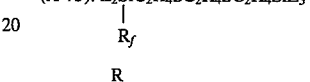
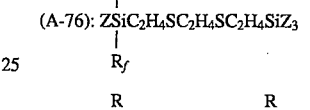
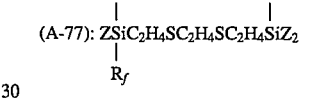
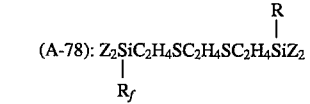
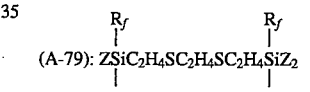
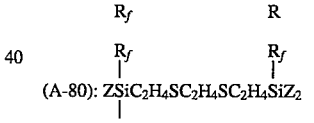

Now, Compound B will be described.

In Compound B, each of $R^5$ to $R^7$ which are independent of one another, is a hydrogen atom or a $C_{1-30}$ monovalent organic group, provided that at least one of them is a hydrophobic organic group. Preferred examples of the monovalent organic group and the hydrophobic organic group are the same as described with respect to Compound A.

In Compound B, $Z^3$ is an isocyanate group or a hydrolyzable group, preferably an isocyanate group. Each of e, g and h which are independent of one another, is 0, 1 or 2, provided 1≦e+g+h≦3. Also in Compound B, it is preferred that two or more reactive silane groups are bonded to one silicon atom. Accordingly, e+g+h is preferably 1 or 2.

Compound B is preferably a compound wherein at least one of $R^5$ to $R^7$ is a monovalent polyfluoroorganic group, and $Z^3$ is an isocyanate group. When $R^5$ to $R^7$ contain a group other than a monovalent polyfluoroorganic group, such a group is preferably a hydrocarbon group other than the above-mentioned hydrophobic organic group. All of $R^5$ to $R^7$ may be hydrophobic organic groups. When any one of $R^5$ to $R^7$ is a monovalent polyfluoroorganic group, it is preferably bonded to a silicon atom via a bivalent hydrocarbon group. As the bivalent hydrocarbon group, an alkylene group, particularly a methylene group, is preferred.

Specific examples of the Compound B of the present invention will be given below, but Compound B is not limited to such specific examples. In the following chemical formulas, n, m, R, $R_f$, $R_F$ and Z are as defined above.

(B-1): $R_FC_2H_4SiZ_3$ (B-2): $R_FC_2H_4SiZ_3$
          |
          R (B-3): $(R_FC_2H_4)SiZ_2$ (B-4): $(R_FC_2H_4)_3SiZ$ (B-5): $R_FCONHC_3H_6SiZ_3$ (B-6): $R_FCONHC_3H_6SiZ_2$
          |
          R (B-7): $R_FCONHC_2H_4NCH_3H_6SiZ_3$ (B-8): $R_FCONHC_2H_4NCH_3H_6SiZ_2$
          |
          R (B-9): $R_FCON(CH_3)C_2H_4CONH(CH_3)SiZ_3$ (B-10): $R_FCON(CH_3)C_2H_4CONH(CH_3)SiZ_2$
           |
           R (B-11): $R_FC_2H_4OCO(CH_2)_2S(CH_2)_3SiZ_3$ (B-12): $R_FC_2H_4OCO(CH_2)_2S(CH_2)_3SiZ_2$
           |
           R (B-13): $R_FC_2H_4OCONH(CH_2)_3SiZ_3$ (B-14): $R_FC_2H_4OCONH(CH_2)_3SiZ_2$
           |
           R (B-15): $R_FC_2H_4NH(CH_2)_2SiZ_3$ (B-16): $R_FC_2H_4NH(CH_2)_2SiZ_2$
           |
           R (B-17): $CF_3C_2F_4O(CFCF_2O)_mCFCONH(CH_2)_3SiZ_3$
                    |           |
                    $CF_3$       $CF_3$ (B-18): $CF_3C_2F_4O(CFCF_2O)_mCFCONH(CH_2)_3SiZ_2$
                    |           |            |
                    $CF_3$       $CF_3$        R

Now, Compound C will be described.

In Compound C, each of $R^8$ to $R^{13}$ which are independent of one another, is a hydrogen atom or a $C_{1-30}$ monovalent organic group, provided that at least one of them is a hydrophobic organic group. Preferred examples of the monovalent organic group and the hydrophobic organic group are the same as described with respect to Compound A. Compound C is preferably a compound wherein at least one of $R^8$ to $R^{13}$ is a monovalent polyfluoroorganic group. Further, all of $R^8$ to $R^{13}$ may be hydrophobic organic groups. When $R^8$ to $R^{13}$ contain a group other than a monovalent polyfluoroorganic group, such a group is preferably a hydrocarbon group other than the above-mentioned hydrophobic organic group. The monovalent polyfluoroorganic group preferably bonds to a silicon atom via a bivalent hydrocarbon group, preferably an alkylene group, particularly preferably a methylene group.

With Compound C, the density and the crosslinking property of the film can be increased by increasing n i.e. the number of repeating units. Further, to increase the number of silicon atoms having isocyanate groups present in Compound C directly bonded thereto, i.e. to increase n, serves to increase the adhesive property of the film to the substrate. However, if n is too large, the operation efficiency during the treatment tends to be poor, whereby the practical usefulness tends to decrease. Accordingly, n is suitably selected depending upon the particular purpose, and it is usually preferably from 0 to 5.

Further, in Compound C, i, j, k, m, p and q which are independent of one another, is 0, 1 or 2, provided $1 \leq i+j \leq 3$, $0 \leq k+m \leq 2$, $1 \leq p+q \leq 3$, and $2 \leq i+j+k+m+p+q \leq 7$. In order to increase the bonding property of Compound C to the substrate, the number of reactive silane groups, preferably isocyanate groups, bonded to one silicon atom, is preferably at least 2. Namely, in Compound C, i+j and p+q are preferably 0 or 1, and k+m is preferably 0.

Now, specific examples of Compound C of the present invention will be given below. However, Compound C is not limited to such specific examples. In the following chemical formulas, n, m, R, $R_f$, $R_F$ and Z are as defined above.

(C-1): $Z_2SiO-(SiO)_n-SiZ_3$ with R and Z substituents; (C-2): $Z_2SiO-(SiO)_n-SiZ_3$ with R and Z and R substituents (C-3): $Z_2SiO-(SiO)_n-SiZ_3$ with $R_f$, Z, R; (C-4): $Z_2SiO-(SiO)_n-SiZ_3$ with R, R, R (C-5): $Z_2SiO-(SiO)_n-SiZ_3$ with $R_f$, $R_f$, R; (C-6): $Z_2SiO-(SiO)_n-SiZ_3$ with $R_f$, R, R (C-7): $Z_2SiO-(SiO)_n-SiZ_3$ with $R_f$, Z, Z; (C-8): $Z_2SiO-(SiO)_n-SiZ_3$ with $R_f$, Z, $R_f$ (C-9): $Z_2SiO-(SiO)_n-SiZ_3$ with R, Z, $R_f$; (C-10): $Z_2SiO-(SiO)_n-SiZ_3$ with $R_f$, $R_f$, $R_f$ (C-11): $Z_2SiO-(SiO)_n-SiZ_3$ with R, $R_f$, $R_f$; (C-12): $Z_2SiO-(SiO)_n-SiZ_3$ with R, R, $R_f$ (C-13): $Z_2SiO-(SiO)_n-SiZ_2$ with R, Z, R, Z; (C-14): $Z_2SiO-(SiO)_n-SiZ_2$ with R, R, R, Z (C-15): $Z_2SiO-(SiO)_n-SiZ_2$ with R, R, R, R; (C-16): $Z_2SiO-(SiO)_n-SiZ_2$ with $R_f$, Z, R, Z (C-17): $Z_2SiO-(SiO)_n-SiZ_2$ with $R_f$, $R_f$, R, Z; (C-18): $Z_2SiO-(SiO)_n-SiZ_2$ with R, $R_f$, R, Z (C-19): $Z_2SiO-(SiO)_n-SiZ_2$ with $R_f$, $R_f$, $R_f$, R; (C-20): $Z_2SiO-(SiO)_n-SiZ_2$ with R, $R_f$, R, $R_f$

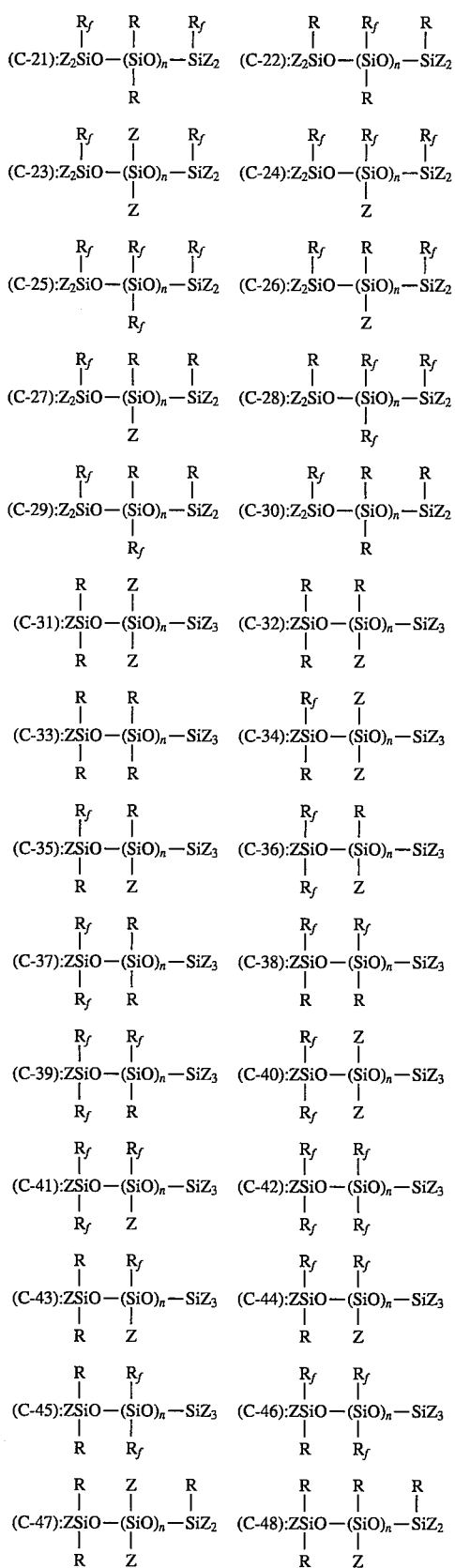
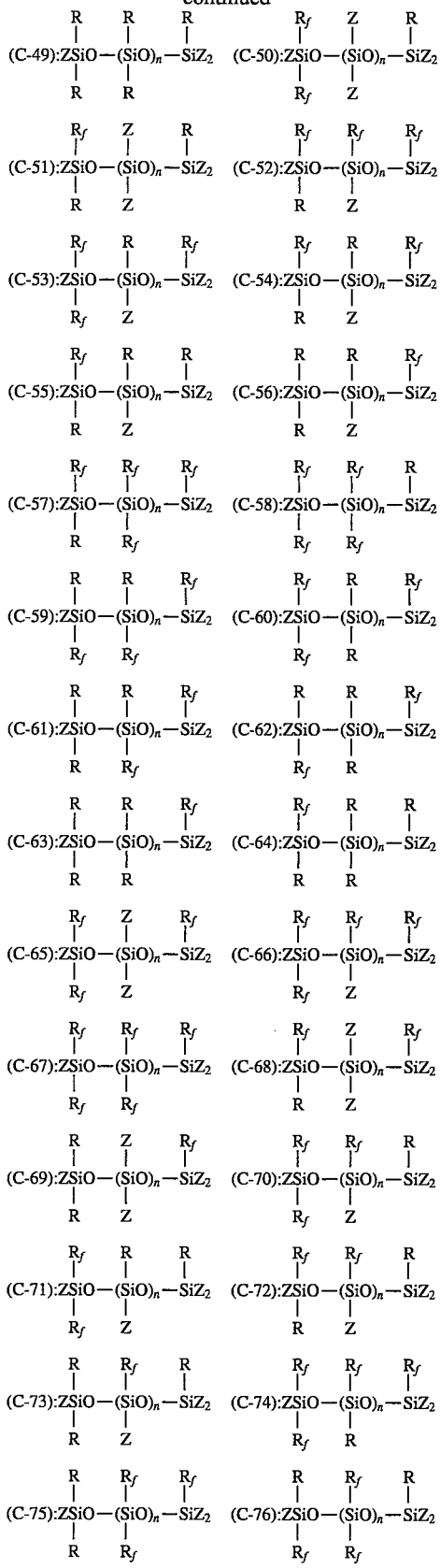

-continued (C-77): Z(R_f)(R)SiO—(SiO)_n(R)(R_f)—SiZ_2

(C-78): Z(R)(R)SiO—(SiO)_n(R)(R_f)—SiZ_2

(C-79): Z(R_f)(R)SiO—(SiO)_n(R)(R)—SiZ_2

(C-80): Z(R)(R)SiO—(SiO)_n(R)(R_f)—SiZ_2

(C-81): Z(R)(R)SiO—(SiO)_n(Z)(Z)—SiZ (C-82): Z(R)(R)SiO—(SiO)_n(R)(Z)—SiR (C-83): Z(R)(R)SiO—(SiO)_n(R)(R)—SiZ (C-84): Z(R)(R)SiO—(SiO)_n(Z)(Z)—SiZ_f (R_f positions)

(C-85): Z(R_f)(R_f)SiO—(SiO)_n(Z)(R)—SiR (C-86): Z(R_f)(R)SiO—(SiO)_n(R_f)(Z)—SiR_f (C-87): Z(R_f)(R)SiO—(SiO)_n(Z)(R_f)—SiR_f (C-88): Z(R_f)(R)SiO—(SiO)_n(R_f)(Z)—SiR (C-89): Z(R)(R)SiO—(SiO)_n(R_f)(Z)—SiR_f (C-90): Z(R)(R)SiO—(SiO)_n(R)(Z)—SiR_f (C-91): Z(R_f)(R_f)SiO—(SiO)_n(Z)(Z)—SiR_f (C-92): Z(R_f)(Z)SiO—(SiO)_n(R_f)(Z)—SiR_f (C-93): Z(R_f)(R_f)SiO—(SiO)_n(R_f)(R_f)—SiR_f (C-94): Z(R_f)(R)SiO—(SiO)_n(Z)(Z)—SiR_f (C-95): Z(R)(R)SiO—(SiO)_n(Z)(Z)—SiR_f (C-96): Z(R_f)(R_f)SiO—(SiO)_n(R)(Z)—SiR (C-97): Z(R_f)(R)SiO—(SiO)_n(R)(Z)—SiR_f (C-98): Z(R)(R)SiO—(SiO)_n(R)(Z)—SiR_f (C-99): Z(R_f)(R)SiO—(SiO)_n(R)(Z)—SiZ (C-100): Z(R)(R_f)SiO—(SiO)_n(R)(Z)—SiR (C-101): (OCN)_3SiOSi(NCO)_2 with CH_3

(C-102): (OCN)_3SiOSi(NCO)_2 with (CH_2)_2CF_3

(C-103): (OCN)_3SiOSi(NCO)_2 with C_8H_17

(C-104): (OCN)_3SiOSi(NCO)_2 with (CH_2)_2C_4F_9

(C-105): (OCN)_3SiOSi(NCO)_2 with C_18H_37

(C-106): (OCN)_3SiOSi(NCO)_2 with (CH_2)_2C_8F_17

(C-107): (OCN)_3SiOSi(NCO)_2 with Ph (C-108): (OCN)_3SiOSi(NCO)_2 with C_8F_17CONH(CH_2)_3

(C-109): (OCN)_3SiOSi(NCO)_2 with C_8F_17CONHC_2H_4NH(CH_2)_3

(C-110): (OCN)_3SiOSi(NCO)_2 with C_8F_17C_2H_4OCOC_2H_4(CH_2)_3

(C-111): (OCN)_3SiOSi(NCO)_2 with C_8F_17C_2H_4OCONH(CH_2)_3

(C-112): (OCN)_3SiOSi(NCO) with (CH_2)_2C_8F_17 and Cl (C-113): (OCN)_2SiOSi(NCO)_2 with (CH_2)_2C_8F_17

(C-114): (OCN)_2SiOSi(NCO)_2 with (CH_2)_2C_8F_17 and CH_3

(C-115): (OCN)SiO—Si(NCO)_2 with Cl and (CH_2)_2C_8F_17 / (CH_2)_2C_8F_17

(C-116): (OCN)SiO—Si(NCO) with (CH_2)_2C_8F_17 / (CH_2)_2C_8F_17 and Cl / Cl (C-117): (OCN)_2SiOSi(NCO)_2 with C_18H_37

(C-118): (OCN)_2SiOSi(NCO)_2 with (CH_2)_2C_8H_17 and CH_3

(C-119): (OCN)SiOSi(NCO)_3 with (CH_2)_2C_8H_17 and (CH_2)_2C_4F_9

(C-120): (OCN)SiOSi(NCO)_3 with C_8H_17 and CH_3

(C-121): (OCN)SiOSi(NCO)_3 with (CH_2)_2C_8F_17 and CH_3

(C-122): (OCN)SiOSi(NCO)_3 with C_8H_17 and (CH_2)_2C_8F_17

(C-123): (OCN)SiO—Si(NCO)_2 with (CH_2)_2C_9F_19 / (CH_2)_2C_9F_19 and (CH_2)_2C_8F_17

$$(C\text{-}124): (OCN)Si(C_2H_4C_8F_{17})(CH_3)O\text{---}Si(NCO)_2(CH_3)$$

$$(C\text{-}125): (OCN)Si((CH_2)_2C_8F_{17})_2 O\text{---}Si(NCO)((CH_2)_2C_9F_{19})_2$$

$$(C\text{-}126): (OCN)Si(CH_3)_2 O\text{---}Si(NCO)(CH_3)_2$$

$$(C\text{-}127): (OCN)Si((CH_2)_2C_8F_{17})_2 O\text{---}Si(NCO)(CH_3)_2$$

$$(C\text{-}128): (OCN)Si(CH_3)(C_8H_{17}) O\text{---}Si(NCO)(CH_3)(C_8H_{17})$$

$$(C\text{-}129): (OCN)_2 Si((CH_2)_2C_8F_{17}) O\text{---}(SiO)_n((CH_2)_2C_8F_{17})(NCO)\text{---}Si(NCO)_3$$

$$(C\text{-}130): (OCN)_2 Si((CH_2)_2C_8F_{17}) O\text{---}(SiO)_n(Cl)(NCO)\text{---}Si(NCO)_3$$

$$(C\text{-}131): (OCN)_2 Si((CH_2)_2C_8F_{17}) O\text{---}(SiO)_n(CH_3)(NCO)\text{---}Si(NCO)_3$$

$$(C\text{-}132): (OCN)_2 Si((CH_2)_2C_8F_{17}) O\text{---}(SiO)_n((CH_2)_2C_8F_{17})(NCO)\text{---}Si(NCO)_3$$

$$(C\text{-}133): (OCN)_2 Si((CH_2)_2C_8F_{17}) O\text{---}(SiO)_n(CH_3)_2 \text{---}Si(NCO)_3$$

$$(C\text{-}134): (OCN)_2 Si((CH_2)_2C_8F_{17}) O\text{---}(SiO)_n(NCO)((CH_2)_2C_8F_{17})\text{---}Si(NCO)_2$$

$$(C\text{-}135): (OCN)_2 Si((CH_2)_2C_8F_{17}) O\text{---}(SiO)_n((CH_2)_2C_8F_{17})(NCO)\text{---}Si(NCO)_2((CH_2)_2C_8F_{17})$$

$$(C\text{-}136): (OCN)_2 Si((CH_2)_2C_8F_{17}) O\text{---}(SiO)_n(CH_3)(NCO)\text{---}Si(NCO)_2((CH_2)_2C_8F_{17})$$

$$(C\text{-}137): (OCN)_2 Si((CH_2)_2C_8F_{17}) O\text{---}(SiO)_n(CH_3)_2 \text{---}Si(NCO)_2((CH_2)_2C_8F_{17})$$

$$(C\text{-}138): (OCN)Si((CH_2)_2C_8F_{17})_2 O\text{---}(SiO)_n(NCO)_2 \text{---}Si(NCO)_3$$

$$(C\text{-}139): (OCN)Si((CH_2)_2C_8F_{17})_2 O\text{---}(SiO)_n((CH_2)_2C_8F_{17})(NCO)\text{---}Si(NCO)_3$$

$$(C\text{-}140): (OCN)Si((CH_2)_2C_8F_{17})_2 O\text{---}(SiO)_n(CH_3)(NCO)\text{---}Si(NCO)_3$$

$$(C\text{-}141): (OCN)Si((CH_2)_2C_8F_{17})_2 O\text{---}(SiO)_n(CH_3)((CH_2)_2C_8F_{17})\text{---}Si(NCO)_3$$

$$(C\text{-}142): (OCN)Si((CH_2)_2C_8F_{17})_2 O\text{---}(SiO)_n(CH_3)(Ph)\text{---}Si(NCO)_3$$

$$(C\text{-}143): (OCN)Si(C_8H_{17})_2 O\text{---}(SiO)_n(CH_3)(Ph)\text{---}Si(NCO)_3$$

$$(C\text{-}144): (OCN)Si(C_8H_{17})_2 O\text{---}(SiO)_n(CH_3)_2 \text{---}Si(NCO)_2(CH_3)$$

$$(C\text{-}145): (OCN)Si((CH_2)_2C_8F_{17})_2 O\text{---}(SiO)_n(NCO)_2 \text{---}Si(NCO)_2((CH_2)_2C_8F_{17})$$

$$(C\text{-}146): (OCN)Si((CH_2)_2C_8F_{17})_2 O\text{---}(SiO)_n(CH_3)(NCO)\text{---}Si(NCO)_2((CH_2)_2C_8F_{17})$$

$$(C\text{-}147): (OCN)Si((CH_2)_2C_8F_{17})_2 O\text{---}(SiO)_n(CH_3)_2 \text{---}Si(NCO)_2((CH_2)_2C_8F_{17})$$

$$(C\text{-}148): (OCN)Si((CH_2)_2C_8H_{17})((CH_2)_2C_8F_{17}) O\text{---}(SiO)_n((CH_2)_2C_8F_{17})(NCO)\text{---}Si(NCO)_2((CH_2)_2C_5F_{17})$$

$$(C\text{-}149): (OCN)Si((CH_2)_2C_8H_{17})((CH_2)_2C_8F_{17}) O\text{---}(SiO)_n(CH_3)(NCO)\text{---}Si(NCO)((CH_2)_2C_8F_{17})_2$$

$$(C\text{-}150): (OCN)Si((CH_2)_2C_8H_{17})((CH_2)_2C_8F_{17}) O\text{---}(SiO)_n(CH_3)_2 \text{---}Si(NCO)((CH_2)_2C_8F_{17})_2$$

$$(C\text{-}151): (OCN)Si(C_8H_{17})_2 O\text{---}(SiO)_n(NCO)_2 \text{---}Si(NCO)(C_8H_{17})_2$$

When Compounds A to C are compounds containing isocyanate groups the surface treated with Compounds A to C is meant for a substrate surface where the isocyanate silane compound is chemically or physically bonded thereto. From the viewpoint of the bonding property to the substrate, the number of isocyanate groups bonded to one silicon atom is preferably at least 2.

An isocyanate group is a reactive group. Accordingly, an isocyanate silane compound is believed to bond to the substrate surface mainly by a chemical reaction. Namely, in the bonded state, the isocyanate group is believed to have changed. For example, an isocyanate group is believed to react with a silanol group on a glass surface, and it is also believed that a silanol group formed by detachment of an isocyanate group bonded to a silicon atom, will react. The isocyanate silane compound is believed to provide excellent surface properties such as water repellency, abrasion resistance, chemical resistance and weather resistance, by the reactivity of isocyanate groups and by the effects of silicon atoms to which isocyanate groups are directly bonded.

Further, in a case where Compounds A to C are compounds containing hydrolyzable groups, the surface treated with compounds A to C means a surface to which a hydrolyzable silane compound is chemically and physically bonded. The hydrolyzable group is reactive. Accordingly, the hydrolyzable silane compound is believed to bond to the surface of the substrate mainly by a chemical reaction. Namely, in the bonded state, the hydrolyzable group is considered to have changed.

The hydrolyzable silane compound is believed to provide excellent surface properties such as water repellency, abrasion resistance, chemical resistance and weather resistance by the reactivity of such hydrolyzable groups or by the effects of the silicon atoms to which the hydrolyzable groups are directly bonded. Further, as described hereinafter, such properties can further be improved by properly selecting the organic group. Further, from the viewpoint of the bonding property to the substrate, the number of hydrolyzable groups bonded to one silicon atom is preferably at least 2.

When Compounds A to C are hydrolyzable silane compounds, such compounds may be used as they are, or may be used in the form of partially hydrolyzed products obtained by hydrolysis in water or in an aqueous acidic solution. The partially hydrolyzed products of such hydrolyzable silane compounds may be compounds formed by partially hydrolyzing such silane compounds or compounds formed by condensation of at least two molecules by a reaction of silanol groups formed by hydrolysis of such hydrolyzable silane compounds. As an acid for the hydrolysis, hydrochloric acid, acetic acid, sulfuric acid, phosphoric acid or sulfonic acid may, for example, be preferred.

Compounds A to C may be used alone, respectively, or may be used in combination of two or more of them as a mixture. In the present invention, it is preferred to use them in combination as a mixture of two or more of them, particularly as a mixture of three Compounds A to C.

When used as a mixture, Compounds A and B forms a siloxane bond at the time of treatment by the reaction of isocyanate groups (or hydroxyl groups) among the molecules, whereby the resulting film will have a high density and crosslinking property, and the mechanical strength and chemical stability of the film will be improved. Further, Compound C is a compound having at least two siloxane bonds in its molecule and thus is capable of forming a siloxane bond by the reaction of the isocyanate groups (or hydrolyzable groups) among the molecules of Compound C. Accordingly, the crosslinking property and density of the resulting film will be remarkably high, and high mechanical strength and chemical stability of the film can be accomplished.

The composition for surface treatment of the present invention is characterized in that it comprises, in addition to the above Compound I, (II) a solvent capable of dissolving Compound I (hereinafter referred to as Solvent II) and (III) a solvent having an evaporation rate lower than the component (II) (hereinafter referred to as Solvent III).

Solvent II is a solvent capable of dissolving Compound I. Solvent II is not particularly limited so long as it is capable of dissolving Compound I, among known or well known solvents. For example, organic solvents such as aliphatic hydrocarbons, aromatic hydrocarbons, halogenated hydrocarbons, ketones, esters, ethers, alcohols, alcohol esters, ketone esters, ketone alcohols, ether alcohols, ketone ethers or ester ethers, may be mentioned. However, in a case where Compound I is a silane compound having an isocyanate group, the one having a reactive hydrogen atom, is not desirable. In the case of other Compounds I having no isocyanate group, there is no particular limitation.

Among them, a polar solvent is preferred as Solvent II. Organic solvents such as ketones, halogenated hydrocarbons, alcohols or esters, are preferred. As Solvent II, one or more solvents may be employed as the case requires.

Specific examples of Solvent II include acetone, methyl ethyl ketone, methyl isopropy ketone, diethyl ketone, methyl isobutyl ketone, hydrochlorofluorocarbon, hydrofluorocarbon, $\alpha,\alpha,\alpha,\alpha',\alpha'$-hexafluoromethaxylene, $\alpha,\alpha,\alpha$-trifluorotoluene, trichloromethane (chloroform), dichloromethane (methyl chloride), trichloroethane, trichloroethylene, methanol, ethanol, 1-propanol, 2-propanol, allyl alcohol, 2-methyl-1-propanol (i-butanol), 2-methyl-2-propanol (t-butanol), methyl formate, ethyl formate, butyl formate, methyl acetate, ethyl acetate, isopropyl acetate, and butyl acetate.

Solvent III of the present invention is a solvent having an evaporation rate lower than Solvent II. The "evaporation rate" means a value represented by a weight reduction when a solvent of the same weight is left to stand at room temperature for one hour. The value of the evaporation rate varies depending upon the type of the solvent, the time for being left to stand, the temperature, the shape or material of the container for the solvent. Accordingly, in this specification, it is represented by a value calculated by the following formula 1 from the value obtained by measurement under the condition specified in Examples (unit: $mg/(cm^2 \times min)$). Further, each of Solvent II and Solvent III may be composed of one solvent or two or more solvents. When two or more solvents are used, a mixture of such solvents in the proportions at the time of use is subjected to measurement under the same measuring conditions, whereby the obtained value is taken as the evaporation rate.

The low evaporation rate means that the evaporation rate defined as above, is relatively small. The evaporation rate of Solvent III is preferably smaller by at least 2.0 $mg/(cm^2 \times min)$, particularly at least 3.5 $mg/(cm^2 \times min)$, than Solvent II. If the difference in the evaporation rate between Solvent III and Solvent II is less than 2.0, the molecular orientation tends to be small, and the obtained film on the surface tends to be inferior in the durability.

The absolute value of the evaporation rate of Solvent II may suitably be changed depending upon the material of the article to be treated or the treating conditions and is not particularly limited. In a usual case, it is preferably at a level of from 2.5 to 60 $mg/(cm^2 \times min)$, particularly from 3.0 to 50 $mg/(cm^2 \times min)$.

Now, preferred examples of Solvent III and Solvent II will be given. Solvent III and Solvent II are distinguished by the relative values of evaporation rates. Accordingly, specific examples shown as Solvent II may also be used as Solvent III.

As Solvent III, various organic solvents such as aliphatic hydrocarbons, aromatic hydrocarbons, halogenated hydrocarbons, ketones, esters, ethers, alcohols, alcohol esters, ketone esters, ketone alcohols, ether alcohols, ketone ethers and ester ethers, may, for example, be mentioned. However, in a case where Compound I has an isocyanate group, a solvent having a reactive hydrogen atom is not desirable. There is no particular restriction as to other Compounds I having no isocyanate group.

As Solvent III, organic solvents such as hydrocarbons, halogenated hydrocarbons such as fluorohydrocarbons, ketones, esters, ethers and alcohols, are preferred. Specifically, the following solvents may be mentioned.

Xylene, toluene, amylnaphthalene, tetrahydronaphthalene, heavy mineral oil spirits, kerosine, wood terpin, pinene, dipentene, terpenes, dry-distilled wood turpentine, diterpene, solvent naphtha, n-decane, n-dodecane, n-tetradecane, n-hexadecane, n-octadecane, $ClCH_2CH_2OCH_2CH_2OCH_2CH_2Cl$, perfluorotrialkylamines such as $(C_4F_9)_3N$, $(C_5F_{11})_3N$, other fluorine-type inactive fluids (such Afrude, tradename, manufactured by Asahi Glass Company Ltd., Fluorinato, tradename, manufactured by 3M), 1-hexanol, 2-ethyl-1-hexanole, 2,6-dimethyl-4-heptanol, cyclohexanol, 1-octanol, 2-phenoxyethanol, cresol, diacetone alcohol, acetylactone, phenylmethylcarbitol, benzyl alcohol, ethylene glycol, 2-methyl-2,4-pentanediol, diethylene glycol, dipropylene glycol triethylene glycol, glycerol, $C_6H_5COCH{=}C(CH_3)C_6H_4$, dihexyl ether, di(2-ethylhexyl)ether, ethylene glycol monomethyl ether, methyl cellosolve acetate, ethylene glycol monobutyl ether, ethylene glycol monophenyl ether, diethylene glycol monoethyl ether, diethylene glycol diethyl ether, $CH_3CH_2OCH_2CH_2OCH_2CH_2OCH_2CH_2OH$, tetraethylene glycol dibutyl ether, terpene glycol ether, 2-ethylhexyl acetate, benzyl acetate, nonyl acetate, diethylene glycol monoethyl ether acetate, diethylene glycol monobutyl ether acetate, dibutyl maleate, dibutyl oxalate, butyl butyrate, ethyl lactate, and butyl lactate.

Among these solvents, as Solvent III, a solvent which hardly dissolves Compound I is preferred, and particularly preferred is a solvent which does not dissolve Compound I. Further, Solvent III is preferably a non-polar solvent. Among the above solvents, a fluorine-containing solvent, a solvent of an aliphatic hydrocarbon type, a solvent of an aromatic hydrocarbon type, or a solvent of ether type is particularly preferred. Further, a fluorine-type inactive fluid, a solvent of a higher aliphatic hydrocarbon type, or a solvent of an aromatic hydrocarbon type, is preferred. Each of Solvents II and III is not particularly limited to one solvent and may be a mixture of two or more solvents.

When the treating agent of the present invention is applied to a substrate, the evaporation rates of Solvents II and III vary depending upon the area of the substrate to be treated (strictly speaking, depending upon the time required for coating). Namely, in a case where the area of the substrate to be treated is small (i.e. the coating time is short), the evaporation rates of Solvents II and III are small, but in a case where the area of the substrate to be treated is large (i.e. the coating time is long), the evaporation rates of Solvents II and III will increase.

In the present invention, two types of solvents i.e. Solvents II and III are employed for the following reasons. Firstly, in order to effectively obtain the antifouling property which Compound I has, it is necessary to apply Compound I at a high concentration. When Compound I is applied in the presence of Solvents III and II i.e. a combination of solvents having different evaporation rates, it is possible to increase the concentration of the applied Compound I.

This mechanism is not clearly understood, but it is considered that at the initial stage of coating, Compound I, Solvent II and Solvent III are coexistent on the substrate surface, then Solvent II which has a relatively higher evaporation rate than Solvent III, will evaporate, and as the evaporation of Solvent II proceeds, the concentration of Compound I in a liquid film formed on the substrate surface increases to accomplish the high concentration.

To obtain the same effects, it is conceivable to attain the high concentration of Compound I by means of a single solvent, but such is disadvantageous from the viewpoint of the cost of e.g. the solvent and the operation efficiency. Further, with a liquid wherein Compound I is highly concentrated beforehand, the interaction among Compound I tends to be substantial, whereby it tends to be difficult to effectively orient Compound I on the substrate surface.

In order to apply Compound I at a higher concentration, it is desired that Solvent III does not dissolve Compound I, or Solvent III provides a lower solubility of Compound I than Solvent II, because when Solvent II has evaporated, Compound I is considered to be present in Solvent III or at the interface between the substrate surface and Solvent III, whereby, if Solvent III does not dissolve Compound I or presents a low solubility of Compound I, Compound I is believed to collect at a higher concentration at the interface between the substrate surface and Solvent III.

Further, when a compound having a hydrophobic organic group and a reactive silane group, is used as Compound I, it is possible to control the structure so that hydrophobic organic groups present in Compound I are oriented at a higher concentration towards the air side, by employing two types of Solvents II and III.

This mechanism is also not clearly understood, but is considered to be as follows. At the stage where Solvent II begins to evaporate, a chemical bond between the substrate and the reactive silane group in Compound I starts to form. However, at this stage, Solvent III having a low evaporation rate still remains at the substrate surface, whereby Compound I has a large degree of freedom in its molecular motion, and Compound I tends to orient to a stable structure from the viewpoint of energy. The stable structure from the viewpoint of energy is a structure such that the reactive silane groups are oriented towards the substrate side and the hydrophobic organic groups are oriented towards the air side. This structure is assumed from the fact that Compound I has reactive silane groups having a high reactivity with the substrate, whereby the reaction with the substrate is believed to start, and the hydrophobic organic groups of Compound I have small surface energy. Accordingly, the hydrophobic organic groups of Compound I are considered to orient in a high concentration towards the air side.

Further, when the treating agent of the present invention contains Compound I having a polyfluoroorganic group, the resulting coating film has a high fluorine concentration and high orientation, whereby the interaction between water drops and the coating film tends to be low, whereby the rolling nature of waterdrops will be improved. This is a merit which has not been observed with conventional treating agents.

In addition to the above effects, the combination of Solvents II and III provides an effect of improving the operation efficiency of the treating agent of the present invention. For example, the handling can be simplified by converting Compound I into a solution by the addition of Solvents II and III. Further, when Compound I has reactive silane groups, if the evaporation rate of the solvent is high, the coating irregularity is likely to occur, but by the presence of Solvent III having a low evaporation rate, coating irregularities can be prevented, and excellent quality of appearance can be obtained. Therefore, even if the area of the substrate to be treated is large, or even if the operation is conducted outdoors under a strong wind, excellent quality of appearance can be obtained.

The concentration of Compound I in the composition for surface treatment is determined taking into consideration the film-forming property (operation efficiency), the stability, the film thickness and the economy, and it is preferably within a range of from 0.1 to 30 wt % in the treating agent. Further, the mixing ratio of Solvents II and III may be suitably determined depending upon the particular purpose. Usually, Solvent III is preferably from 5 to 70 wt %, based on the total amount of Solvents II and III. If the proportion of Solvent III is less than 5 wt %, it tends to be difficult to obtain the effects of the present invention, and if it exceeds 70 wt %, the operation efficiency tends to be poor.

To the composition for surface treatment according to the present invention, other compounds or additives may be incorporated depending upon the particular purpose or application. The additives may suitably be selected taking into consideration the reactivity and compatibility with various components. For example, superfine particles of various metal oxides such as silica, alumina, zirconia or titania, and various resins may, for example, be mentioned. If coloring is required, a dye or pigment may be incorporated. The amount of such additives is preferably within a range of from 0.01 to 20 wt %, based on the total weight of the composition for surface treatment. Excessive incorporation reduces the water repellency, the abrasion resistance or the like.

Further, when it is desired to impart electrical conductivity, a material whereby a desired resistance can be obtained (such as tin oxide, ITO ($In_2O_3$—$SnO_2$) or zinc oxide) may be incorporated. The amount of such an additive may be determined depending upon the desired resistance and the material, and it is not particularly limited.

The composition for surface treatment of the present invention is applied usually by coating it on a substrate, followed by removing the solvents by evaporation. In such application, no special pretreatment is required, but pretreatment may be carried out depending upon the particular purpose. For example, acid treatment with diluted hydrofluoric acid or hydrochloric acid, alkali treatment with an aqueous solution of sodium hydroxide or potassium hydroxide, or discharge treatment by means of plasma irradiation, can be conducted.

The composition for surface treatment can be applied to the substrate surface by a usual method such as brush coating, casting, rotary coating, dip coating or spray coating. Then, the applied composition may be dried in air or in a nitrogen stream. This treating agent exhibits excellent performance simply by drying in air at room temperature, but for the purpose of e.g. improving the drying rate, it may be heated. The temperature for heating is preferably at a level of from 50° to 250° C., and the heating time is preferably from 5 to 60 minutes. The conditions for drying may optionally be changed depending upon e.g. the heat resistance of the substrate.

The thickness of the coating film formed by the composition for surface treatment is not particularly limited. The thickness is desired to be as thin as possible. The film thickness is preferably from the thickness of a single molecular layer to 2 μm. The thickness of the coating film can be suitably controlled by adjusting e.g. the concentrations of the components of the composition for surface treatment, the coating conditions or the heating conditions.

The coating film obtained by the composition for surface treatment has a low refractive index, whereby a low reflectance can be imparted. When low reflectance is expected, the film thickness of the coating film may be controlled to a film thickness where optical interference will take place.

The substrate to which the composition for surface treatment can be applied, is not particularly limited. For example, inorganic materials such as metals, plastics, ceramics and glass, or organic materials, or a combination thereof (such as a composite material or a laminated material) may, for example, be mentioned. Further, the surface of the substrate may be the surface of the substrate itself, or a surface of a material different from the substrate, which is present on the substrate surface, such as a coated surface such as a coated metal, or a surface-treated layer surface of surface-treated glass (such as a surface provided with e.g. a sol gel film, a sputtered film, a CVD film or a vapor-deposited film). The shape of the substrate is not limited to be flat, and it may be an optional shape depending upon the particular purpose, including the one having a curvature entirely or partially.

The composition for surface treatment of the present invention is capable of providing the performance even by room temperature treatment. Accordingly, it can be applied to a substrate which is already in use for some purpose, to impart a function such as an antifouling property. Thus, it can be applied in a wide range, which has not been seen heretofore.

A substrate particularly useful in the present invention is a substrate made of a transparent material such as glass, and a suitable article is an article provided therewith. Accordingly, it is particularly preferred that substrates treated with the treating agent of the present invention are used for articles for transportation equipments or articles for architecture or architectural decorations. The articles for transportation equipments include, for example, exterior parts such as exterior panels, window glasses, mirrors or surface materials of display equipments and interior parts such as surface materials of instrument panels in transportation equipments such as electric trains, buses, trucks, automobiles, ships or aircrafts, and articles to be used for other transportation equipments, as well as articles and constituting parts which have been used. Such articles may be those composed solely of surface-treated substrates, or those having such surface treated substrates incorporated therein. For example, the former includes window glasses for automobiles, and the latter includes back mirror parts for automobiles, in which glass mirrors are incorporated.

The articles for transportation equipments include, for example, the bodies, window glasses and pantographs of electric trains, bodies, front glasses, side glasses, rear glasses, mirrors, bumpers, etc. of automobiles, buses, trucks, etc., bodies, window glasses, etc. of ships, and bodies and window glasses, etc. of aircrafts.

With a substrate or article treated with the composition for surface treatment of the present invention, waterdrops deposited on the surface will be repelled by the water repellency, and especially in operation, will rapidly move on the surface by the interaction with the wind pressure received, without remaining as waterdrops, whereby adverse effects to be created by water can be avoided. Especially for the use at various see-through portions such as window glasses, the visual field can easily be secured by dissipation of waterdrops, whereby safety of vehicles can be improved. Further, freezing of waterdrops can be avoided even under an environment where waterdrops are otherwise likely to freeze, and even if they freeze, defreezing is remarkably quick. Furthermore, since waterdrops scarcely deposit, the number of periodical cleaning operations can be reduced, and yet, cleaning operation is easy, which is very advantageous also from the viewpoint of protection of the beautiful appearance.

The articles for architecture and architectural decorations include, for example, articles to be attached to buildings, articles already attached to buildings, as well as articles for architecture which may not be attached to buildings but may be used therewith, such as furnitures and utensils, and base materials (such as glass plates) as constituting elements of such articles.

Specifically, they include window glass plates, window glasses, glass plates for roofs and various roofs such as glass roofs, glass plates for doors and doors provided therewith, glass plates for partition, glass plates for green houses and green houses provided therewith, transparent plastic plates to be used instead of glass and above-mentioned articles for architecture (such as window materials and roof materials) provided therewith, all materials made of ceramics, cement, metals or other materials, mirrors and furnitures provided therewith, and glass materials for display cases or show cases.

The articles for architecture or architectural decorations may be those composed solely of surface-treated substrates or may be those having such surface-treated substrates incorporated therein. For example, the former includes window glass plates, and the latter includes furnitures having glass mirrors incorporated therein.

With the surface-treated substrate, waterdrops in contact with the surface will be repelled by the water repellency, whereby they will scarcely deposit, or even if they deposit, the amount is little, or removal of deposited waterdrops is easy. Further, freezing of waterdrops can be avoided even under an environment where waterdrops are otherwise likely to freeze, or even if they freeze, defreezing is remarkably quick. Further, since waterdrops scarcely deposit, the number of periodical cleaning operations can be reduced, and yet cleaning operation is easy, which is very advantageous also from the viewpoint of protection of the beautiful appearance.

Now, the present invention will be described in further detail with reference to Examples. However, it should be understood that the present invention is by no means restricted to such specific Examples. Various evaluation methods used in the following Examples are as follows.

1. Evaluation of the antifouling property a) Measurement of the contact angle with water and the contact angle with hexadecane $C_{16}H_{34}$.

b) Finger print removal property: A finger print was deposited on the treated surface and then wiped with a cotton cloth for 20 reciprocations, whereupon the appearance was inspected and evaluated under the following evaluation standards:

A: Oil stains completely wiped off.
   B: Oil stains slightly remain.
   C: Oil stains substantially remain.

c) Waterdrop remaining property: From a nozzle maintained at a distance of 20 cm from a test sample, water was sprayed over the entire surface for one hour, whereupon waterdrops remaining on the surface were visually observed and evaluated under the following evaluation standards:

A: No water remains on the sample surface.
   B: Water slightly remains on the sample surface.
   C: Waterdrops substantially remain on the sample surface.
   D: Water spreads over the sample surface.

2. Evaluation of the abrasion resistance

A reciprocal abrasion tester manufactured by KNT K. K. was used as a tester, and an abrasion test was carried out by using a flannel cloth under such test conditions as a load of 1 kg for 30,000 reciprocations, whereupon the finger print removal property and the waterdrop remaining property were evaluated.

3. Test method for the weather resistance

A process comprising 8 hours (70° C.) of ultraviolet irradiation and 4 hours (50° C.) of moist exposure, was taken as one cycle, and the test was carried for 250 cycles.

4. Measuring method for evaporation rates 5.0 g of a solvent was put in a top-open type aluminum dish (diameter of the top-open portion: 4 cm, depth: 1 cm) and left to stand at 35° C. for 5 minutes, whereby the weight reduction was measured. However, in a case where the evaporation rate was so high that upon expiration of 5 minutes, the amount of the remaining solvent was not sufficient to completely cover the bottom portion of the aluminum dish, the time for being left was shortened to 3 minutes, whereby the weight reduction was measured. From the weight reduction, the evaporation rate (unit: mg/(cm$^2$·min)) was calculated by the following formula, and the results are shown in Table 1. Evaporation rate (mg/(cm$^2$·min))=weight reduction (mg) of the solvent/[surface area (cm$^2$) of the aluminum dish×time of being left (min)].

TABLE 1

| Solvent | AK-225 | AcOEt | HFMX | $(C_4F_9)_3N$ | $(C_5F_{11})_3N$ | n-$C_{16}H_{34}$ |
| --- | --- | --- | --- | --- | --- | --- |
| Evaporation rate | 39.80 | 10.74 | 5.29 | 0.64 | 0.23 | 0.06 |

5. Measuring method for the waterdrop rolling property

On a sample substrate maintained horizontally, 50 µl of waterdrops were dropped, and then the sample substrate was inclined at a constant angle rate, whereby the inclination angle when waterdrops started to move, was measured.

Preparation of Treating Agents 1 to 10

Into a flask equipped with a stirrer and a thermometer, Compound I, Solvent II and Solvent III as identified in Table 2 were added in the amounts as identified in Table 2. While maintaining the liquid temperature of this solution at 25° C., stirring was continued for one full day to obtain the respective treating agents. Table 2 also shows the difference in the evaporation rate (unit: mg/(cm$^2$·min)) between Solvents II and III.

TABLE 2

| Treating agent | Compound I | | Solvent II | | Solvent III | | Difference in evaporation rate |
|---|---|---|---|---|---|---|---|
| 1 | Compound A1 | 3.0 g | AK-225 | 58.2 g | $(C_4F_9)_3N$ | 38.8 g | 39.16 |
| 2 | Compound A1 | 3.0 g | AK-225 | 77.6 g | $n\text{-}C_{16}H_{34}$ | 19.4 g | 39.74 |
| 3 | Compound B1 | 3.0 g | AcOEt | 77.6 g | $n\text{-}C_{16}H_{34}$ | 19.4 g | 10.68 |
| 4 | Compound C1 | 3.0 g | AcOEt | 67.9 g | $(C_4F_9)_3N$ | 29.1 g | 10.10 |
| 5 | Compound D | 3.0 g | AK-225 | 67.9 g | $(C_5F_{11})_3N$ | 29.1 g | 39.57 |
| 6 | Compound A1 | 3.0 g | HFMX | 58.2 g | $(C_4F_9)_3N$ | 38.8 g | 4.65 |
| 7 | Compound A1 | 3.0 g | AK-225 | 98.0 g | Nil | | — |
| 8 | Compound B1 | 3.0 g | AcOEt | 97.0 g | Nil | | — |
| 9 | Compound C1 | 3.0 g | AcOEt | 97.0 g | Nil | | — |
| 10 | Compound D | 3.0 g | AK-225 | 97.0 g | Nil | | — |

Compounds represented by abbreviations in Tables 1 and 2 are those identified in Table 3.

TABLE 3

| | |
|---|---|
| AK-225 | Mixture of $CF_3CF_2CHCl_2$ and $CClF_2CF_2CHClF$ (tradename, manufactured by Asahi Glass Company Ltd.) |
| EcOEt | Ethyl acetate |

TABLE 3-continued

| | |
|---|---|
| HFMX | $\alpha,\alpha,\alpha,\alpha',\alpha',\alpha'$-hexafluoromethaxylene |
| Compound A1 | $(C_8F_{17}C_2H_4)(OCN)_2SiOSi(C_8F_{17}C_2H_4)(NCO)_2$ |
| Compound B1 | $C_{18}H_{37}Si(NCO)_3$ |
| Compound C1 | $C_8F_{17}C_2H_4Si(NCO)_3$ |
| Compound D | Mixture of polytetrafluoroethylenes having molecular weights of from 3000 to 5000 |

EXAMPLES 1 to 6 and COMPARATIVE EXAMPLES 1 to 4

30 cc of a treating agent as identified in Table 4 was dropped on a soda lime glass sheet of 200 cm×200 cm with a thickness of 6 mm, preliminarily subjected to cerium oxide polishing, and spread by a JK wiper (product of Jujo Kimberly K. K.) in a manner of waxing an automobile and left to stand over a full day. The coating and leaving it to stand were carried out outdoors. The weather conditions at the time of coating were such that the temperature was 29° C., the relative humidity was 65%, and the wind was south wind of 6 m. The quality of appearance (presence or absence of coating irregularities) of the obtained sample glass was visually inspected, and a part of the sample glass was cut out to evaluate the antifouling property. The results are shown in Table 4.

TABLE 4

| | Treating agent | Coating irregularities | Initial stage | | | | After durability test | |
|---|---|---|---|---|---|---|---|---|
| | | | Contact angle $C_{16}H_{34}$ | Contact angle Water | Finger print removal property | Waterdrop remaining property | Finger print removal property | Waterdrop remaining property |
| Example 1 | 1 | Absent | 75° | 112° | A | A | A | A |
| Example 2 | 2 | Absent | 75° | 113° | A | A | A | A |
| Example 3 | 3 | Absent | 15° | 104° | B | A | B | A |
| Example 4 | 4 | Absent | 71° | 109° | A | A | A | A |
| Example 5 | 5 | Absent | 44° | 88° | A | B | B | B |
| Example 6 | 6 | Absent | 75° | 113° | A | A | A | A |
| Comparative Example 1 | 7 | Present | 73° | 110° | A | A | B | B |
| Comparative Example 2 | 8 | Present | 16° | 102° | B | A | B | C |
| Comparative Example 3 | 9 | Present | 68° | 107° | A | A | C | B |
| Comparative Example 5 | 10 | Present | 43° | 87° | A | B | C | C |

EXAMPLE 7

A part of the sample glass in Example 1 was cut out and immersed in a reagent as identified in Table 5 for 24 hours, whereupon the sample glass was taken out and immediately washed with water. Then, the change in the appearance of this sample and the effect for the antifouling property were evaluated. The results are shown in Table 5.

TABLE 5

| | Appearance | Finger print removal property | Waterdrop remaining property |
|---|---|---|---|
| $CH_3OH$ | No change | A | A |
| $CH_3COCH_3$ | No change | A | A |
| 1% $H_2SO_4$ aqueous solution | No change | A | A |

TABLE 5-continued

| | Appearance | Finger print removal property | Waterdrop remaining property |
|---|---|---|---|
| 1% NAOH aqueous solution | No change | A | A |
| Gasoline | No change | A | A |

EXAMPLE 8

A part of the sample glass prepared in Example 1 was cut out, and subjected to a weather resistance test. The change in the appearance of the sample and the effect of the antifouling property after the test were evaluated, whereby no change was observed in the appearance, the finger print removal property was evaluated to be A and the waterdrop remaining property was evaluated to be A.

EXAMPLES 9 and 10, and COMPARATIVE EXAMPLES 5 and 6

Instead of the soda lime glass in Example 1, an acrylic plate (AC) was used in Example 9, and an aluminum plate (AL) was used in Example 10. In Comparative Example 5, the acrylic plate was used without any treatment, and in Comparative Example 6, the aluminum plate was used without any treatment. The results of the evaluations conducted in the same manner are shown in Table 6.

EXAMPLES 11 to 13

The sample glass in Example 1 was baked at a temperature of 100° C., 200° C. or 300° C., and then evaluated in the same manner. The results are shown in Table 6.

TABLE 6

| | Substrate | Baking temperature (°C.) | Contact angle $C_{16}H_{34}$ | Contact angle Water | Initial stage Finger print removal property | Waterdrop remaining property | After durability test Finger print removal property | Waterdrop remaining property |
|---|---|---|---|---|---|---|---|---|
| Example 9 | AC | | 75° | 112° | A | A | A | A |
| Example 10 | AL | | 75° | 113° | A | A | A | A |
| Comparative Example 5 | AC | | 21° | 61° | C | D | C | D |
| Comparative Example 6 | AL | | 46° | 76° | C | C | C | D |
| Example 11 | | 100 | 72° | 113° | A | A | A | A |
| Example 12 | | 200 | 71° | 112° | A | A | A | A |
| Example 13 | | 300 | 70° | 110° | A | A | A | A |

EXAMPLES 14 to 18

The sample glasses obtained in Examples 1, 2, 4 and 7 and the acrylic plate obtained in Example 9 were used, respectively, as sample substrates, and the respective waterdrop rolling properties were examined. The results are shown in Table 7.

TABLE 7

| | Sample substrates | Waterdrop rolling properties |
|---|---|---|
| Example 14 | Example 1 | 16 degree |
| Example 15 | Example 2 | 16 degree |
| Example 16 | Example 4 | 15 degree |
| Example 17 | Example 7 | 25 degree |
| Example 18 | Example 9 | 23 degree |

As described in the foregoing, the composition for surface treatment of the present invention has the following excellent features.

1. It provides an excellent antifouling property by room temperature treatment.

2. It provides excellent chemical resistance, abrasion resistance and weather resistance and is excellent in the long lasting effect of the antifouling property. Therefore, these properties can be maintained semipermanently.

3. It can be applied continuously to a wide range of substrates. Further, it requires no special pretreatment, and thus presents a high economical effect.

4. It requires no special application environment and can be applied even outdoors under a strong wind.

5. It can be applied to various substrates to which conventional agents may not be applied.

What is claimed is:

1. A composition for surface treatment, which comprises the following components (I), (II) and (III) as essential components:

(I) at least one compound capable of forming a coating film with a contact angle of at least 70° against water;

(II) a solvent capable of dissolving the component (I); and (III) a fluorine-containing solvent or an aliphatic hydrocarbon, having an evaporation rate in units of mg/(cm$^2$·min) lower than the component (II) at 35° C.

2. The composition for surface treatment according to claim 1, wherein the component (I) is a silane compound having at least one hydrophobic organic group and at least one silicon atom having an isocyanate group or a hydrolyzable group directly bonded thereto.

3. The composition for surface treatment according to claim 1, wherein the component (I) is at least one member selected from the group consisting of silane compounds of the following formulas (A), (B) and (C):

(A) $(Z^1)_{3-a-b}(R^1)_a(R^2)_b\text{Si}-Y-\text{Si}(R^3)_c(R^4)_d(Z^2)_{3-c-d}$ wherein each of $R^1$ to $R^4$ which are independent of one another, is a hydrogen atom or a $C_{1-30}$ monovalent organic group, Y is a bivalent organic group, provided that at least one of $R^1$ to $R^4$ and Y is a hydrophobic organic group, each of $Z^1$ and $Z^2$ which are independent of each other, is an isocyanate group or a hydrolyzable group, each of a and b which are independent of each other, is 0, 1 or 2, provided $0 \leq a+b \leq 2$, and each of c and d which are independent of each other, is 0, 1 or 2, provided $0 \leq c+d \leq 2$;

(B) $(R^5)_e(R^6)_g(R^7)_h\text{Si}(Z^3)_{4-e-g-h}$ wherein each of $R^5$ to $R^7$ which are independent of one another, is a hydrogen atom or a $C_{1-30}$ monovalent organic group, provided that at least one of them is a hydrophobic organic group, $Z^3$ is an isocyanate group or a hydrolyzable group, and each of e, g and h which are independent of one another, is 0, 1 or 2, provided $1 \leq e+g+h \leq 3$; and (C) $(R^8)_i(R^9)_j(Z^4)_{3-i-j}\text{SiO}[(R^{10})_k(R^{11})_m(Z^5)_{2-k-m}\text{SiO}]_n-\text{Si}(R^{12})_p(^{13})_q(Z^6)_{3-p-q}$ wherein each of $R^8$ to $R^{13}$ which are independent of one another, is a hydrogen atom or a $C_{1-30}$ monovalent organic group, provided that at least one of them is a hydrophobic organic group, each of $Z^4$ to $Z^6$ which are independent of one another, is an isocyanate group or a hydrolyzable group, each of i, j, k, m, p and q which are independent of one another, is 0, 1 or 2, provided $1 \leq i+j \leq 3$, $0 \leq k+m \leq 2$, $1 \leq p+q \leq 3$ and $2 \leq i+j+k+m+p+q \leq 7$, and n is an integer of 0 or at least 1.

4. The composition for surface treatment according to claim 2, wherein the hydrophobic organic group is a polyfluoroorganic group or a long chain hydrocarbon group.

5. The composition for surface treatment according to claim 2, wherein the hydrophobic organic group is an organic group having a $C_{3-21}$ perfluoroalkyl moiety or a $C_{2-16}$ perfluoroalkylene moiety.

6. The composition for surface treatment according to claim 2, wherein the hydrophobic organic group is a hydrocarbon group having a $C_{7-30}$ alkyl moiety or a $C_{7-16}$ alkylene moiety.

7. The composition for surface treatment according to claim 2, wherein the hydrolyzable group is a halogen atom, an alkoxy group, an acyloxy group, an alkoxy-substituted alkoxy group, an oxyamino group, an amino group or a —C=N—OH group.

8. The composition for surface treatment according to claim 2, wherein the silane compound is a compound having at least one isocyanate group.

9. The composition for surface treatment according to claim 3, wherein all of $Z^1$ to $Z^6$ are isocyanate groups.

10. The composition for surface treatment according to claim 3, wherein the hydrophobic organic group is a polyfluoroorganic group or a long chain hydrocarbon group.

11. The composition for surface treatment according to claim 3, wherein the hydrophobic organic group is an organic group having a $C_{3-21}$ perfluoroalkyl moiety or a $C_{2-16}$ perfluoroalkylene moiety.

12. The composition for surface treatment according to claim 1, wherein the difference in the evaporation rate as defined in the specification between the components (II) and (III) is at least 2.0 mg/(cm²·min).

13. The composition for surface treatment according to claim 1, wherein the component (III) is a solvent incapable of dissolving the component (I) or a solvent providing a lower solubility of the component (I) than the component (II).

14. The composition for surface treatment according to claim 1, wherein the component (III) is a non-polar solvent.

15. A substrate coated with the composition for surface treatment as defined in claim 1.

16. An article comprising the substrate as defined in claim 15.

17. A the step of coating method which comprises treating a substrate with the composition for surface treatment as defined in claim 1.

18. A treating method with a composition for surface treatment, which comprises coating on a substrate the composition for surface treatment as defined in claim 1, followed by removal of the solvents by evaporation.

19. A treating method with a composition for surface treatment, which comprises coating the composition for surface treatment as defined in claim 1 on a substrate at room temperature.

* * * * *